United States Patent
Kim et al.

(10) Patent No.: US 8,615,564 B2
(45) Date of Patent: Dec. 24, 2013

(54) METHOD AND SYSTEM FOR CHANNEL SCANNING IN A MESH NETWORK

(75) Inventors: Jung-Ho Kim, Suwon-si (KR);
Young-Gon Choi, Suwon-si (KR);
Ji-Hoon Lee, Cheongju-si (KR);
Yong-Sung Roh, Icheon-si (KR);
Jae-Hoon Kim, Seoul (KR);
Shubhranshu Singh, Yongin-si (KR)

(73) Assignee: Samsung Electroncis Co., Ltd., Suwon-si (KR)

( * ) Notice: Subject to any disclaimer, the term of this patent is extended or adjusted under 35 U.S.C. 154(b) by 1850 days.

(21) Appl. No.: 11/432,384

(22) Filed: May 12, 2006

(65) Prior Publication Data
US 2006/0271703 A1  Nov. 30, 2006

Related U.S. Application Data

(60) Provisional application No. 60/679,992, filed on May 12, 2005.

(30) Foreign Application Priority Data

Apr. 18, 2006 (KR) .................... 10-2006-0035159

(51) Int. Cl.
*G06F 15/16* (2006.01)
(52) U.S. Cl.
USPC .......................................... 709/218; 709/249
(58) Field of Classification Search
None
See application file for complete search history.

(56) References Cited

U.S. PATENT DOCUMENTS

| 5,119,397 | A | 6/1992 | Dahlin et al. |
| 5,717,688 | A | 2/1998 | Belanger et al. |
| 6,434,132 | B1 | 8/2002 | Ishii et al. |
| 7,606,175 | B1 * | 10/2009 | Maufer ........................ 370/255 |

(Continued)

FOREIGN PATENT DOCUMENTS

| EP | 0 603 100 | 6/1994 |
| JP | 2002-374279 | 12/2002 |

(Continued)

OTHER PUBLICATIONS

Geier, Jim, "Understanding 802.11 Frame Types", Internet Archive Wayback Machine, http://web.archive.org/web/20041101093706/http://www.wi-fiplanet.com/tutorials/article.php/1447501, Published: Nov. 1, 2004, Accessed: Dec. 23, 2009.*

(Continued)

*Primary Examiner* — Thomas Dailey
*Assistant Examiner* — Nam Tran
(74) *Attorney, Agent, or Firm* — NSIP Law

(57) ABSTRACT

A channel scanning method and system at an MP within a mesh network associated with a local network are provided. A MAP sends a local management frame including information about a mesh network on an allocated local channel and sends a mesh management frame on a mesh channel indicated by the mesh network information. An MP scans a plurality of channels including the local channel and the mesh channel in an order of channels numbers, receives the local management frame by scanning the local channel, and receives the mesh management frame by scanning the mesh channel based on the mesh network information of the local management frame.

16 Claims, 8 Drawing Sheets

(56) References Cited

U.S. PATENT DOCUMENTS

| | | |
|---|---|---|
| 2003/0063593 A1 | 4/2003 | Koyanagi et al. |
| 2004/0137905 A1 | 7/2004 | Jeong et al. |
| 2004/0157613 A1 | 8/2004 | Steer et al. |
| 2004/0253954 A1 | 12/2004 | Lee et al. |
| 2007/0189249 A1* | 8/2007 | Gurevich et al. ............ 370/338 |
| 2007/0258508 A1* | 11/2007 | Werb et al. .................... 375/140 |

FOREIGN PATENT DOCUMENTS

| | | |
|---|---|---|
| KR | 2002-0079726 | 10/2002 |
| KR | 2003-0028366 | 4/2003 |
| KR | 2004-0070891 | 8/2004 |
| KR | 2004-0091088 | 10/2004 |
| WO | WO 02/054820 | 7/2002 |
| WO | WO 03/075513 | 9/2003 |

OTHER PUBLICATIONS

Kishi, etc. 'A proposal of an adaptive channel allocation and traffic engineering algorithm in multi-hop mesh networks for broadband fixed wireless access' Wireless Communications and Networking, 2003. WCNC 2002. IEEE vol. 2, Mar. 16-20, 2003 pp. 1043-1048 vol. 2.

Tasaki, etc. 'A new channel assignment strategy towards the wireless mesh networks' Communications, 2004 and the $5^{th}$ International Smyposium on Multi-Dimensional Mobile Communications Proceedings. The 2004 Joint Conference of the $10^{th}$ Asia-Pacific Conference on vol. 1, Aug 29-Sep. 1, 2004 pp. 71-75 vol. 1.

* cited by examiner

US 8,615,564 B2

METHOD AND SYSTEM FOR CHANNEL SCANNING IN A MESH NETWORK

PRIORITY

This application claims priority under 35 U.S.C. §119 to an application Ser. No. 60/679,992 filed in the U.S. Patent and Trademark Office on May 12, 2005 and an application Serial No. 2006-35159 filed in the Korean Intellectual Property Office on Apr. 18, 2006, the entire disclosures of both of which are hereby incorporated by reference.

BACKGROUND OF THE INVENTION

1. Field of the Invention

The present invention relates generally to a channel scanning method and a wireless system in a wireless network. More particularly, the present invention relates to a channel scanning method and a wireless system in a mesh network.

2. Description of the Related Art

Today, mobile communication technology is being developed toward maximization of transmission rate and frequency use efficiency in order to provide multimedia service. A major example is a mobile access network. The mobile access network refers to a network that provides high-speed wireless service to terminals within predetermined service coverage.

Traditionally, the mobile access network is a set of local networks each including Access Points (AP) and legacy stations (STAs). A legacy STA receives an intended radio service by associating with an AP.

The mobile access network is evolving to a mesh network which is a wireless extended combination of a plurality of local networks. The mesh network is comprised of a plurality of mesh nodes. Each mesh node is configured to serve as an AP in a local network and also to exchange information directly with neighboring APs by communicating with them using radio resources.

Channel scanning is required for association between a legacy STA and an AP and association between mesh nodes. The channel scanning is the process of detecting a neighboring node to associate with. Therefore, channel scanning occurs between mesh nodes in a mesh network and between a legacy STA and an AP in a local network.

If an identical management frame format is used for channel scanning in a conventional local network and for channel scanning in a mesh network, a legacy STA to associate with the local network cannot distinguish received management frames. Thus, it may attempt to associate with the mesh network.

Conventional channel scanning is characterized by scanning every channel. Even when an intended channel is detected, the other channels are scanned which takes a considerable amount of time.

Accordingly, there is a need for an improved system and method for channel scanning to facilitate fast detection of a mesh network at a Mesh Point (MP).

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and system for channel scanning, which facilitates fast detection of a mesh network at a Mesh Point.

Exemplary embodiments of the present invention provide a method and system for channel scanning based on information about a mesh network received in a local management frame in the mesh network.

Yet another object of exemplary embodiments of the present invention is to provide a method and system for channel scanning in which information about a mesh network is sent in a local management frame to an MP in the mesh network.

Exemplary embodiments of the present invention also provide a method and system for channel scanning, in which information about a mesh network is delivered in a Local Probe Response message for a Probe Request message.

Exemplary embodiments of the present invention provide a method and system for channel scanning, in which information about a mesh network is sent in a Local Beacon message.

Exemplary embodiments of the present invention provide a method and system for channel scanning, in which an MP receives a mesh channel number in a local management frame and receives a mesh management frame by scanning a channel corresponding to the mesh channel number.

According to one aspect of an exemplary embodiment of the present invention, in a channel scanning method at an MP within a mesh network associated with a local network, the MP receives a local management frame used in the local network, detects information about the mesh network from the local management frame, and receives a mesh management frame used in the mesh network by scanning a mesh channel indicated by the mesh network information.

According to another aspect of an exemplary embodiment of the present invention, in a channel scanning method in a mobile access network, a MAP sends a local management frame including information about a mesh network on an allocated local channel and sends a mesh management frame on a mesh channel indicated by the mesh network information. An MP scans a plurality of channels including the local channel and the mesh channel in an order of channel numbers. The MP receives the local management frame by scanning the local channel and receives the mesh management frame by scanning the mesh channel based on the mesh network information of the local management frame.

According to a further aspect of an exemplary embodiment of the present invention, in a channel scanning system in a mobile access network, a MAP sends a local management frame including information about a mesh network on an allocated local channel and sends a mesh management frame on a mesh channel indicated by the mesh network information. An MP scans a plurality of channels including the local channel and the mesh channel in an order of channel numbers. The MP receives the local management frame by scanning the local channel and receives the mesh management frame by scanning the mesh channel based on the mesh network information of the local management frame.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention is directed to fast channel scanning for a neighbor mesh node of a mesh node within a mesh network. There are three types of mesh nodes: MP, MAP and Mesh Portal (MPP). The MP, MAP and MPP commonly function as MPs. For example, they function to connect between mesh nodes. The MAP serves as an AP and an MP. As an AP, the MAP forms a local network through association with a legacy STA. The MPP covers the functionalities of the MP, MAP and mesh portal. As a mesh portal, the MPP connects a different network, such as a wired network, to a mesh network.

In accordance with an exemplary embodiment of the present invention, a new management frame is defined for channel scanning. The management frame may be a Beacon message or a Probe Response message. A management frame from a local network (local management frame) is distinguished from a management frame from a mesh network (mesh management frame). For this purpose, a management frame has identification information by which a local management frame is distinguished from a mesh management frame.

Figure 1:
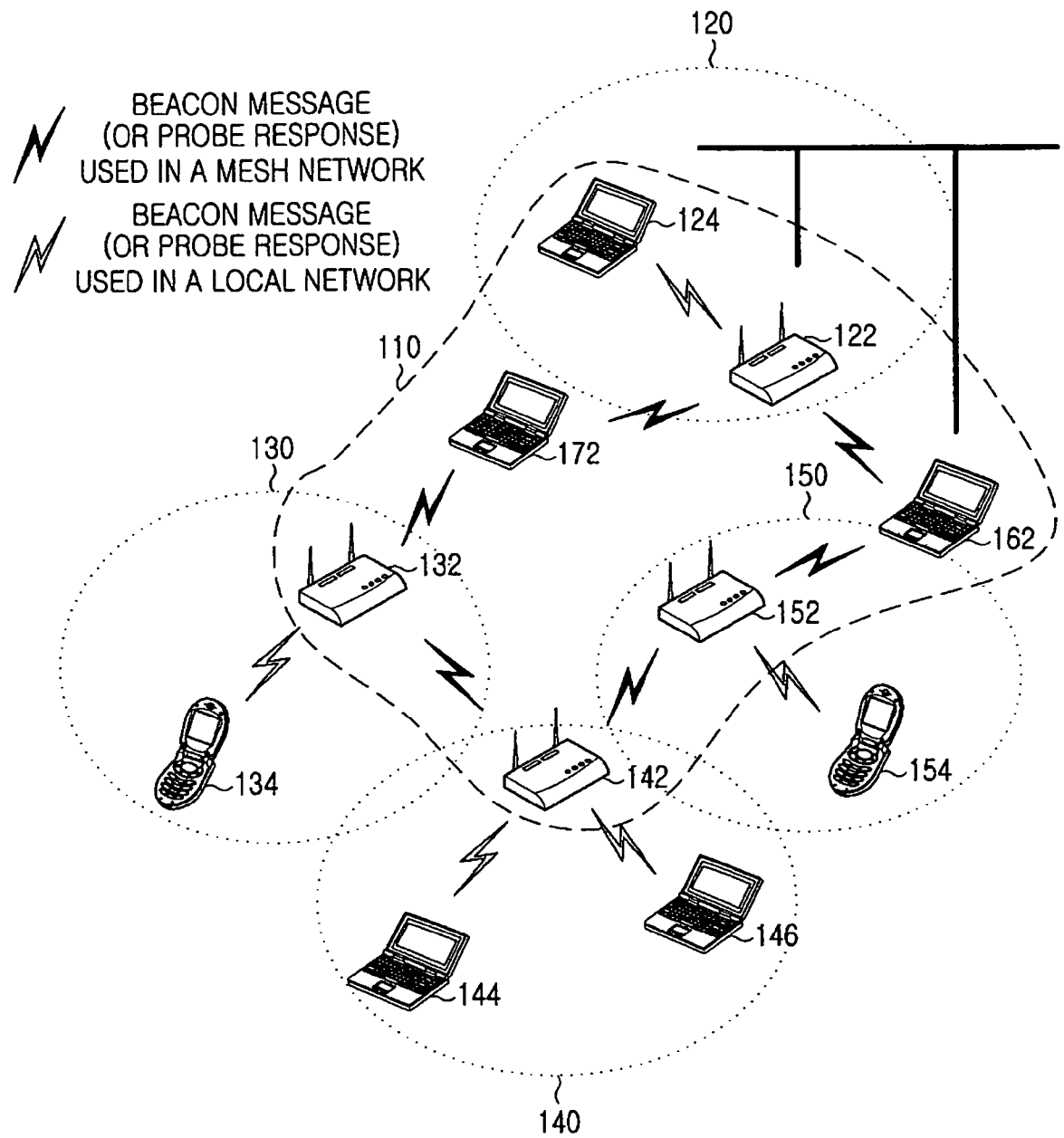
FIG. 1 illustrates an exemplary mobile access network to which channel scanning according to an exemplary embodiment of the present invention can be applied.

FIG. 1 illustrates an exemplary mobile access network to which channel scanning according to an exemplary embodiment of the present invention can be applied.

Referring to FIG. 1, the mobile access network has a combination of a mesh network 110 and local networks 120 to 150. The mesh network 110 includes a plurality of mesh nodes 122, 132, 142, 152, 162 and 172. Every mesh node functions as an MP. The mesh nodes 122, 132, 142 and 152 also function as APs, while the mesh nodes 122 and 162 function as MPPs.

Each local network is configured to include one AP and at least one legacy STA associated with the AP. The APs 122, 132, 142 and 152 are mesh nodes which function as APs.

A mesh management frame for channel scanning in the mesh network needs to be pre-defined. The mesh nodes 122, 132, 142, 152, 162 and 172 each send the mesh management frame on one of their internal channels. The mesh management frame is a Mesh Beacon message or a Mesh Probe Response message. The Mesh Beacon message and the Local Probe Response message are used for passive channel scanning and active channel scanning, respectively in the mesh network 10. The Local Probe Response message is sent in response to a Mesh Probe Request message.

Meanwhile, a local management frame for channel scanning in the local networks 120, 130, 140 and 150 needs to be pre-defined. Each of the APs 122, 132, 142 and 152 in the local networks sends the local management frame on one of its internal channels. The APs 122, 132, 142 and 152 are mesh nodes acting as APs.

The local management frame is a Local Beacon message or a Local Probe Response message. The Local Beacon message and the Local Probe Response message are used for passive channel scanning and active channel scanning, respectively in the local networks 120 130, 140 and 150. The Local Probe Response message is sent in response to a Local Probe Request message.

When a mesh node wants to associate with a neighboring mesh node, it sequentially scans channels, receives management frames on the channels, and identifies whether the management frames are mesh management frames or local management frames.

In cases involving a mesh management frame, the mesh node attempts to associate with a neighboring mesh node corresponding to the mesh management frame. In cases involving a local management frame, the mesh node acquires channel switching information from the local management frame.

The channel switching information provides the number of a channel for delivering a mesh management frame. The mesh node directly switches to the channel indicated by the channel switching information and receives a mesh management frame on the switched channel. At this point, the mesh node stops scanning channels. Consequently, the mesh node can quickly associate with the neighboring mesh node.

The local management frame must include channel switching information. A new format is defined for the channel switching information according to an exemplary embodiment of the present invention. For example, the channel switching information can be written in the Frame Body field of an existing management frame. In addition to a channel number, the channel switching information may further include a residual switching time.

A legacy STA in a local network may avoid the error of attempting entry into the mesh network 110 because it cannot interpret a mesh management frame. The legacy STA is confined to a reception of a local management frame since a received management frame has a value that identifies a local management frame or a mesh management frame.

Figure 10:
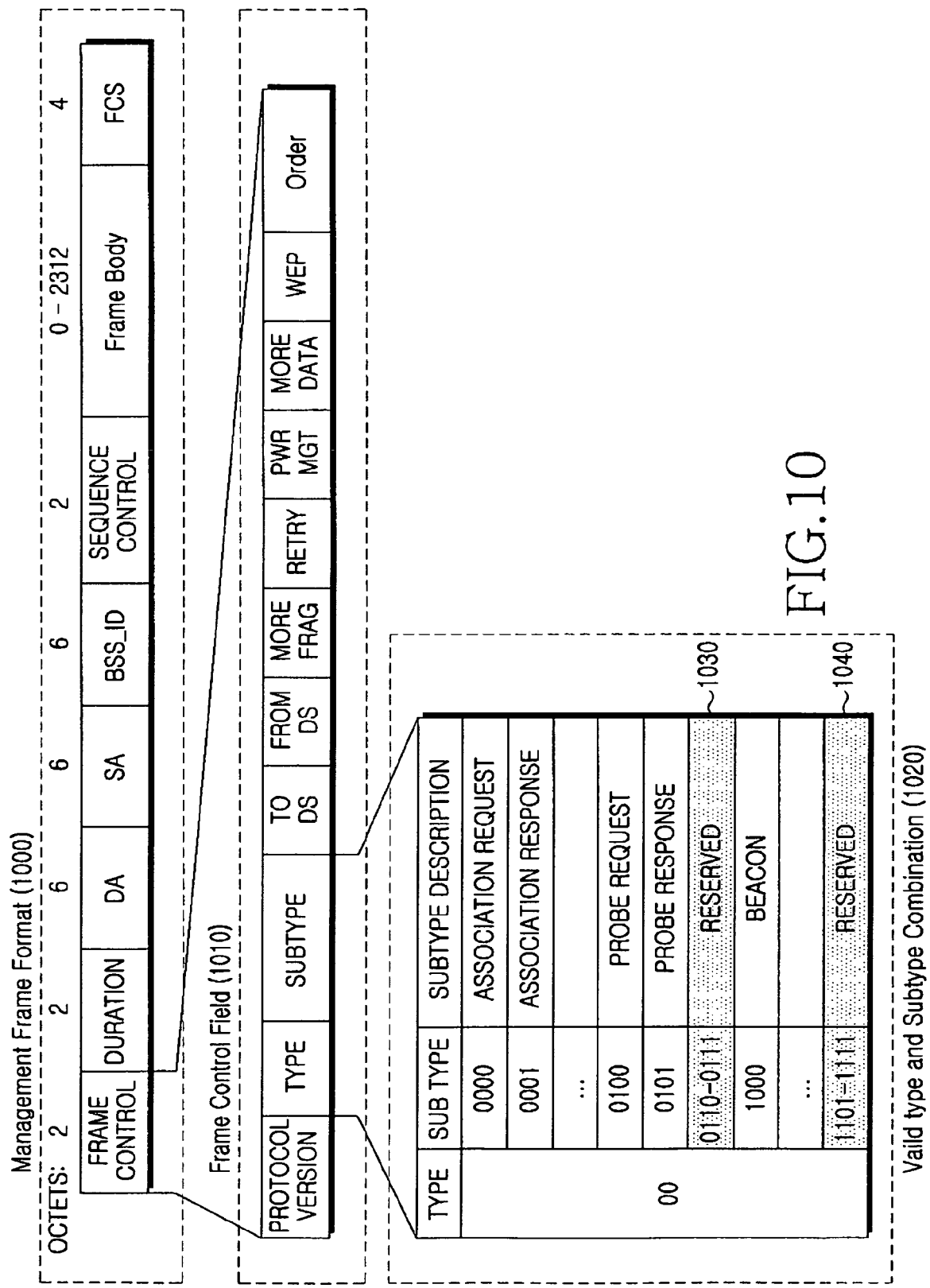
FIG. 10 illustrates the structure of a newly defined mesh management frame or local management frame according to an exemplary embodiment of the present invention.

FIG. 10 illustrates the structure of a newly defined mesh management frame or local management frame according to an exemplary embodiment of the present invention.

Referring to FIG. 10, the management frame has a Frame Control field which includes a Type and a Subtype. The Subtype field identifies the management frame as a local management frame or a mesh management frame. According to the value of the Subtype field, the mesh management frame is indicated as a Mesh Beacon message or a Local Probe Response message, and the local management frame is indicated as a Local Beacon message or a Local Probe Response message.

The shaded sections of FIG. 10 indicate different reserved values used to indicate the Mesh Beacon message and the Mesh Probe Response message.

Alternatively, conventionally defined values are used to indicate the Local Beacon message and the Local Probe Response message.

Active channel scanning and passive channel scanning according to an exemplary embodiment of the present invention is described.

The active channel scanning is performed by a Probe Response message and the passive channel scanning by a Beacon message.

A. Active Channel Scanning

Active channel scanning in a mesh network according to an exemplary embodiment of the present invention will be described below.

Figure 2:
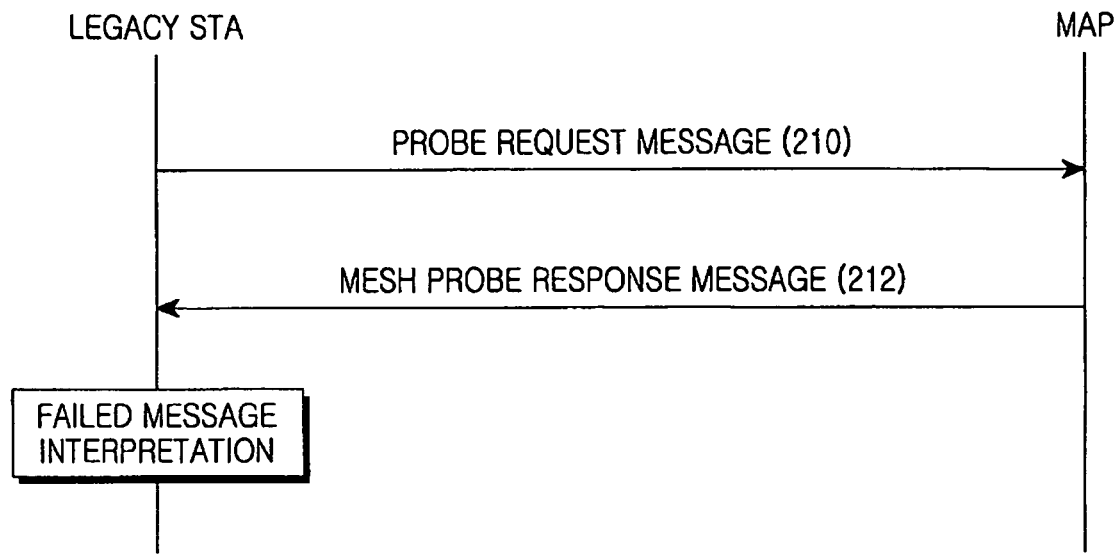
FIG. 2 is a diagram illustrating a signal flow between a legacy STA and a Mesh Access Point (MAP) for each channel in an active channel scanning method according to an exemplary embodiment of the present invention.

FIG. 2 is a diagram illustrating a signal flow between a legacy STA and a MAP for each channel in an active channel scanning method according to an exemplary embodiment of the present invention. The MAP is a mesh node functioning as an AP among mesh nodes forming a mesh network.

Referring to FIG. 2, the legacy STA broadcasts a Probe Request message requesting association with a neighbor MAP in step 210. Upon receipt of a Local Probe Response message in response to the Probe Request message, the legacy STA attempts to associate with a corresponding MAP. The Local Probe Response message is received on a channel used in a local network (hereinafter, referred to as a local channel). The corresponding MAP is a MAP that has sent the Local Probe Response message.

After broadcasting the Probe Request message, the legacy STA may also receive a Mesh Probe Response message on a channel used in a mesh network (hereinafter, referred to as a mesh channel) in step 212. This results from the MAP's ability to send the Local Probe Response message on the local channel and the Mesh Probe Response message on the mesh channel.

In cases involving the Mesh Probe Response message, the legacy STA fails to interpret the Mesh Probe Response message because it can identify that the received message is not an intended Probe Response message from the message identification information of the Mesh Probe Response message.

Figure 3:
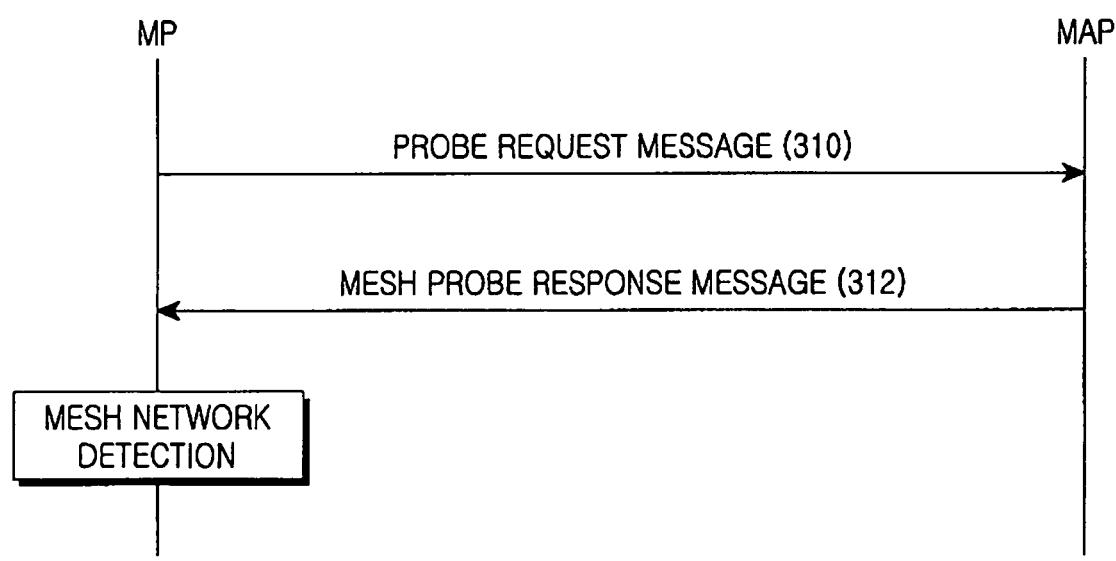
FIG. 3 is a diagram illustrating a signal flow between mesh nodes within a mesh network for each channel in the active channel scanning method according to an exemplary embodiment of the present invention.

FIG. 3 is a diagram illustrating a signal flow between mesh nodes within a mesh network for each channel in the active channel scanning method according to an exemplary embodiment of the present invention. The scenario in which an MP sends a Probe Request message and in which a MAP replies with a Mesh Probe Response message is assumed.

Referring to FIG. 3, the MP broadcasts the Probe Request message requesting association with a neighbor MAP in step 310. The MP receives a Mesh Probe Response message for the Probe Request message in step 312. The MP then attempts to associate with the MAP that has sent the Mesh Probe Response message.

After broadcasting the Probe Request message, the MP can also receive a Local Probe Response message on a local channel because the MAP sends the Local Probe Response message on the local channel and the Local Probe Response message on a mesh channel.

Upon receipt of the Local Probe Response message, the MP checks channel switching information set in the received message, transitions to a channel indicated by the channel switching information, and receives a Local Probe Response message on the channel.

Figure 4:
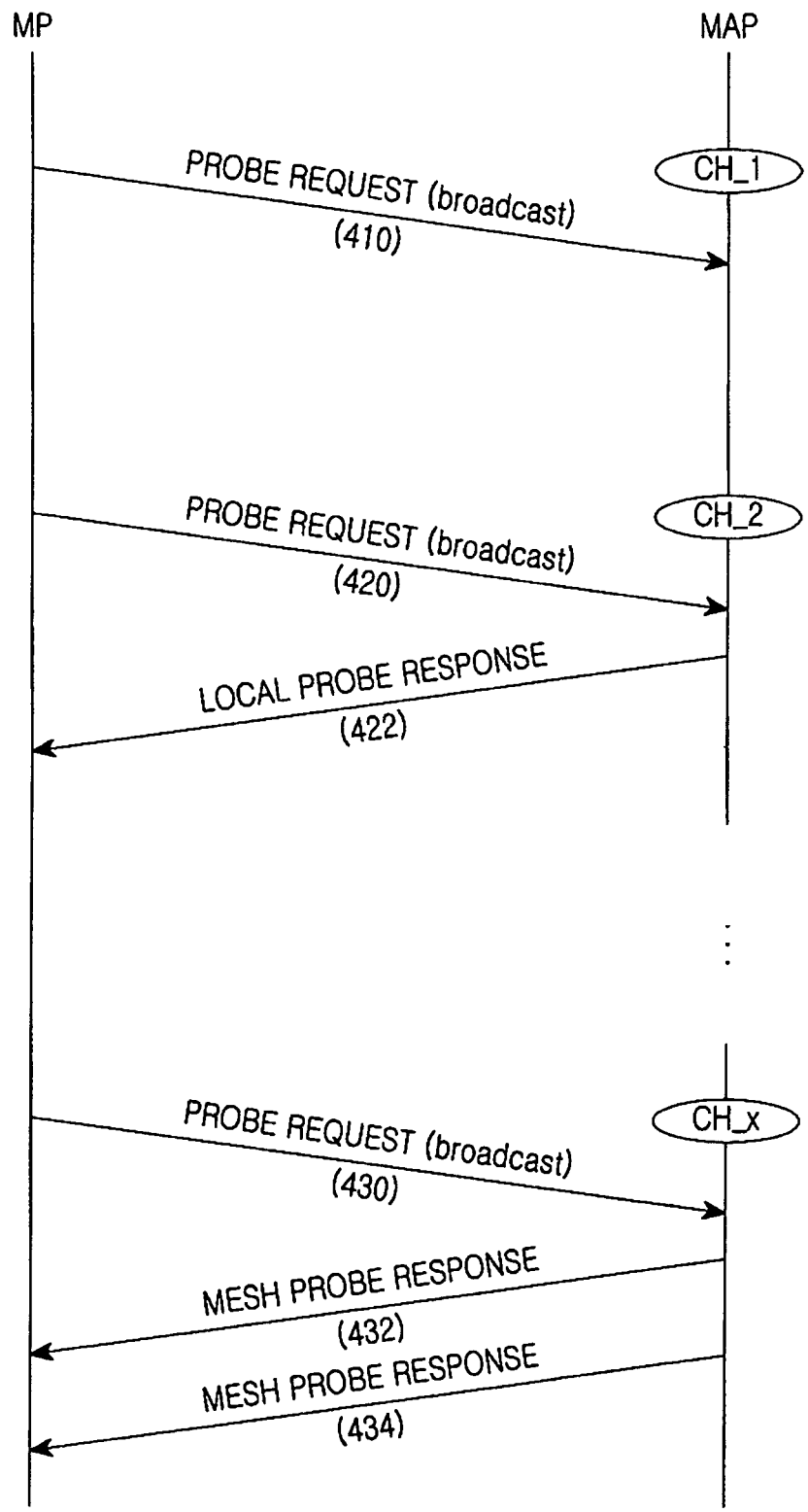
FIG. 4 illustrates a virtual scenario of the active channel scanning method according to an exemplary embodiment of the present invention.

FIG. 4 illustrates a virtual scenario of the active channel scanning method according to an exemplary embodiment of the present invention. In the virtual scenario, a plurality of MAPs are considered. A local channel for one MAP is denoted by CH_2 and a common mesh channel for a plurality of MAPs is denoted by CH_x.

Referring to FIG. 4, an MP broadcasts a Probe Request message on a first channel, CH_1 in a predetermined time interval in step 410. CH_1 is a local channel. The MP monitors reception of a Probe Response message on CH_1. The channel monitoring is done for a preset channel monitoring time.

When the Probe Response message is not received until the channel monitoring time expires, the MP broadcasts the Probe Request message on CH_2 in step 420. CH_2 is also a local channel.

Upon receipt of the Probe Request message on CH_2, a MAP sends a Local Probe Response message in step 422.

The MP monitors reception of the Probe Response message on CH_2. When the Local Probe Response message is received before the channel monitoring time expires in step 422, the MP checks channel switching information in the Local Probe Response message and acquires a channel number (CH_x) for association with the mesh network from the channel switching information. That is, the channel number indicates the channel carrying a Mesh Probe Response message.

The MP transitions to the acquired mesh channel CH_x without performing the sequential channel scanning according to channel numbers. In step 430, the MP broadcasts the Probe Request message on CH_x. The broadcast time depends on the interface supported by the MP.

If the interface supports a single radio multi-channel, the Probe Request message is broadcast only during a mesh network transmission period. If the channel transition occurs during a local network transmission period, the MP waits until the mesh network transmission period begins. When the mesh network transmission period starts, the MP broadcasts the Probe Request message. The single radio multi-channel supports only the mesh channel or the local channel.

Alternatively, if the interface supports a multi-radio multi-channel, the MP broadcasts the Probe Request message immediately when the channel transition occurs. The multi-radio multi-channel supports a common channel and a plurality of data channels for the mesh network.

At least one MAP, which has received the Probe Request message on CH_x, sends a Mesh Probe Response message in steps 432 and 434.

Upon receipt of the Mesh Probe Response message, the MP discontinues the channel scanning for association with the mesh network. That is, even in the presence of channels not yet scanned, the MP no longer performs the channel scanning.

Figure 5:
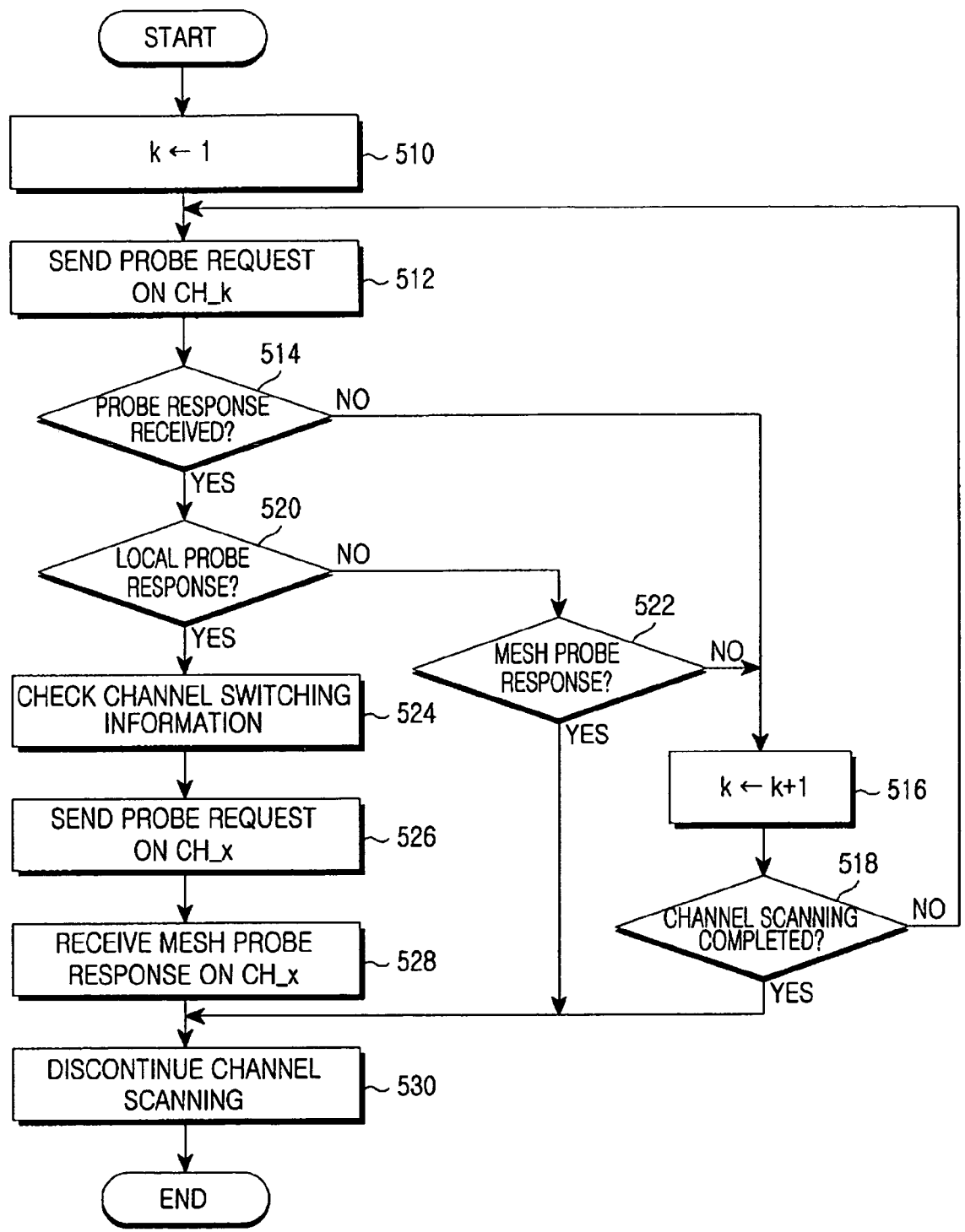
FIG. 5 is a flowchart illustrating a control operation in an MP for performing the active channel scanning method according to an exemplary embodiment of the present invention.

FIG. 5 is a flowchart illustrating a control operation in an MP for performing the active channel scanning method according to an exemplary embodiment of the present invention.

Referring to FIG. 5, when channel scanning starts, the MP sets a channel number k to an initial value 1 in step 510. The channel number k is an indication of a channel to be scanned.

In step 512, the MP broadcasts a Probe Request message on a $k^{th}$ channel, CH_k. The MP monitors reception of a Probe Response message on CH_k in step 514. The monitoring lasts for a preset channel monitoring time.

If the MP fails to receive the Probe Response message on CH_k, the MP increases k by 1 to select the next channel to be scanned in step 516. In step 518, the MP determines whether every channel has been scanned. After every channel has been scanned, the MP terminates the channel scanning in step 530. Otherwise, the MP scans the next channel in steps 512 and 514.

Upon receipt of the Probe Response message on CH_k in step 514, the MP determines whether the Probe Response message is a Local Probe Response message in step 520.

In cases involving the Local Probe Response message, the MP checks channel switching information in the Local Probe Response message and determines that CH_x is a channel to switch to from the channel switching information in step 524.

The MP scans CH_x by sending the Probe Request message on CH_x in step 526. If the MP supports a single radio multi-channel, it broadcasts the Probe Request message in a mesh network transmission period, if the MP supports a multi-radio multi-channel, it immediately broadcasts the Probe Request message.

Upon receipt of a Mesh Probe Response message in step 528, the MP discontinues the channel scanning even in the presence of channels to be scanned in step 530.

If the Probe Response message is not a Local Probe Response message in step 520, the MP determines whether the Probe Response message is a Mesh Probe Response message in step 522. If so, the MP discontinues the channel scanning in step 530. If the Probe Response message is not a Mesh Probe Response message in step 522, the MP increases k by 1 to select the next channel to be scanned in step 516. In step 518, the MP determines whether every channel has been scanned. Upon completion of channel scanning for every channel, the MP terminates the channel scanning in step 530. Otherwise, the MP scans the next channel in steps 512 and 514.

In accordance with an exemplary embodiment of the present invention as described above, a Mesh Probe Response message can be received in response to a transmitted Probe Request message in a mesh network. Also, transmission of channel switching information in the Local Probe Response message facilitates switching to a channel on which association with the mesh network is possible. When the mesh network is associated, no further channel scanning is performed.

B. Passive Channel Scanning

Passive channel scanning in a mesh network according to another exemplary embodiment of the present invention will be described below.

Figure 6:
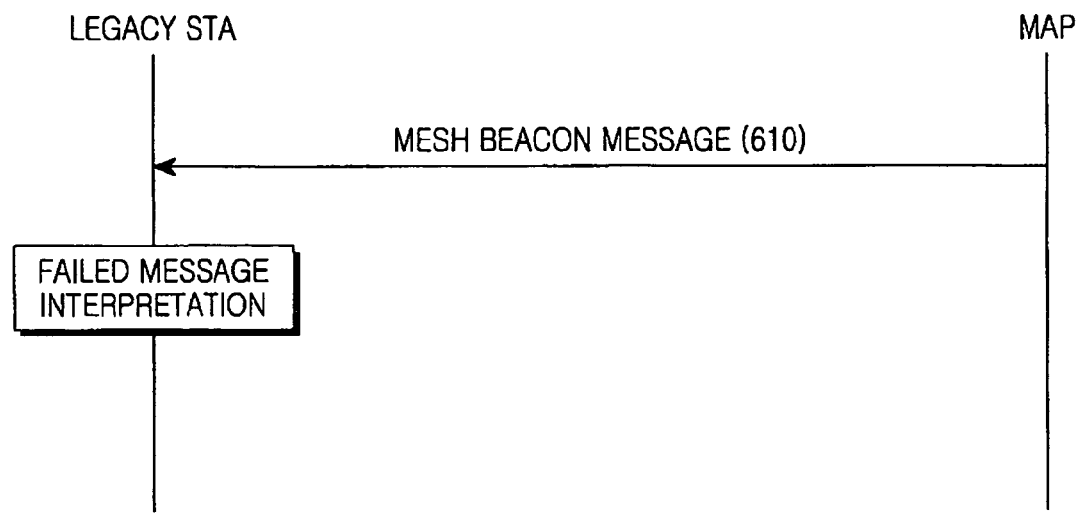
FIG. 6 is a diagram illustrating a signal flow between a legacy STA and a MAP for each channel in a passive channel scanning method according to another exemplary embodiment of the present invention.

FIG. 6 is a diagram illustrating a signal flow between a legacy STA and a MAP for each channel in a passive channel scanning method according to another exemplary embodiment of the present invention. The MAP is a mesh node functioning as an AP among mesh nodes forming a mesh network.

Referring to FIG. 6, the MAP broadcasts a Mesh Beacon message in step 610. The Mesh Beacon message may be broadcast in a preset period. If the MAP supports a single radio multi-channel, it broadcasts the Mesh Beacon message in a mesh network transmission period. If the MAP supports a multi-radio multi-channel, it broadcasts the Mesh Beacon message in a preset period.

The legacy STA receives the Mesh Beacon message in step 610. The Mesh Beacon message indicates the location of the MAP to neighboring MPs within the mesh network. The legacy STA fails to interpret the Mesh Beacon message because it determines that the received message is not an intended Beacon message from the message identification information of the Mesh Beacon message.

Figure 7:
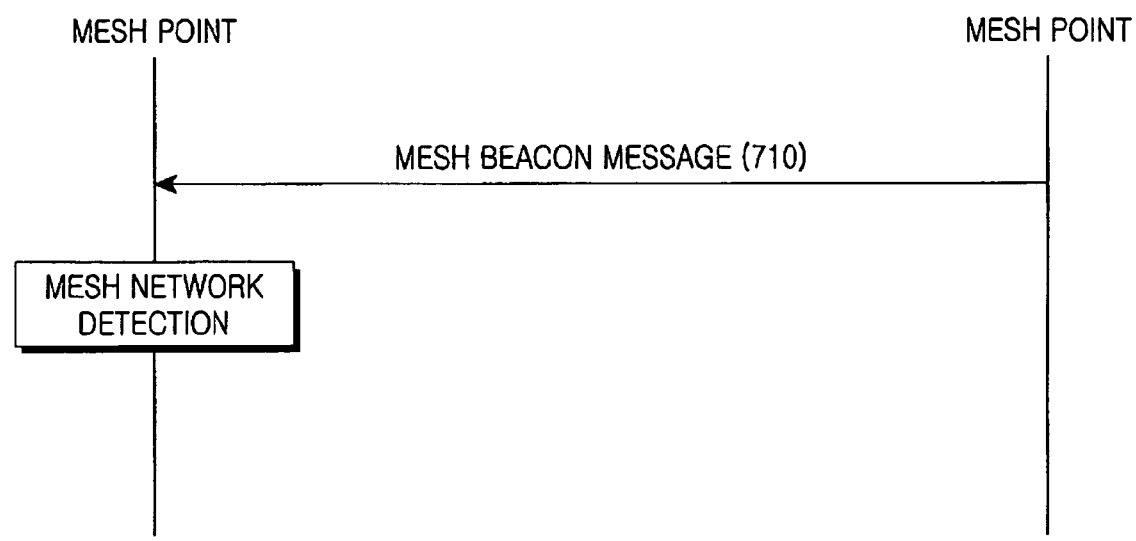
FIG. 7 is a diagram illustrating a signal flow between mesh nodes within a mesh network for each channel in the passive channel scanning method according to the second exemplary embodiment of the present invention.

FIG. 7 is a diagram illustrating a signal flow between mesh nodes within a mesh network for each channel in the passive channel scanning method according to the second exemplary embodiment of the present invention. The scenario in which a MAP sends a Mesh Beacon message is assumed.

Referring to FIG. 7, the MAP broadcasts a Mesh Beacon message in step 710. The Mesh Beacon message can be broadcast in a preset period. If the MAP supports a single radio multi-channel, it broadcasts the Mesh Beacon message in a mesh network transmission period. If the MAP supports a multi-radio multi-channel, it broadcasts the Mesh Beacon message in a preset period.

Upon receipt of the Mesh Beacon message in step 710, an MP attempts to associate with the MAP.

Alternatively, the MP may also receive a Local Beacon message because the MAP can send both the Local Beacon message and the Mesh Beacon message.

Upon receipt of the Local Beacon message, the MP checks channel switching information set in the received message, transitions to a channel indicated by the channel switching information, and receives a Mesh Beacon message.

Figure 8:
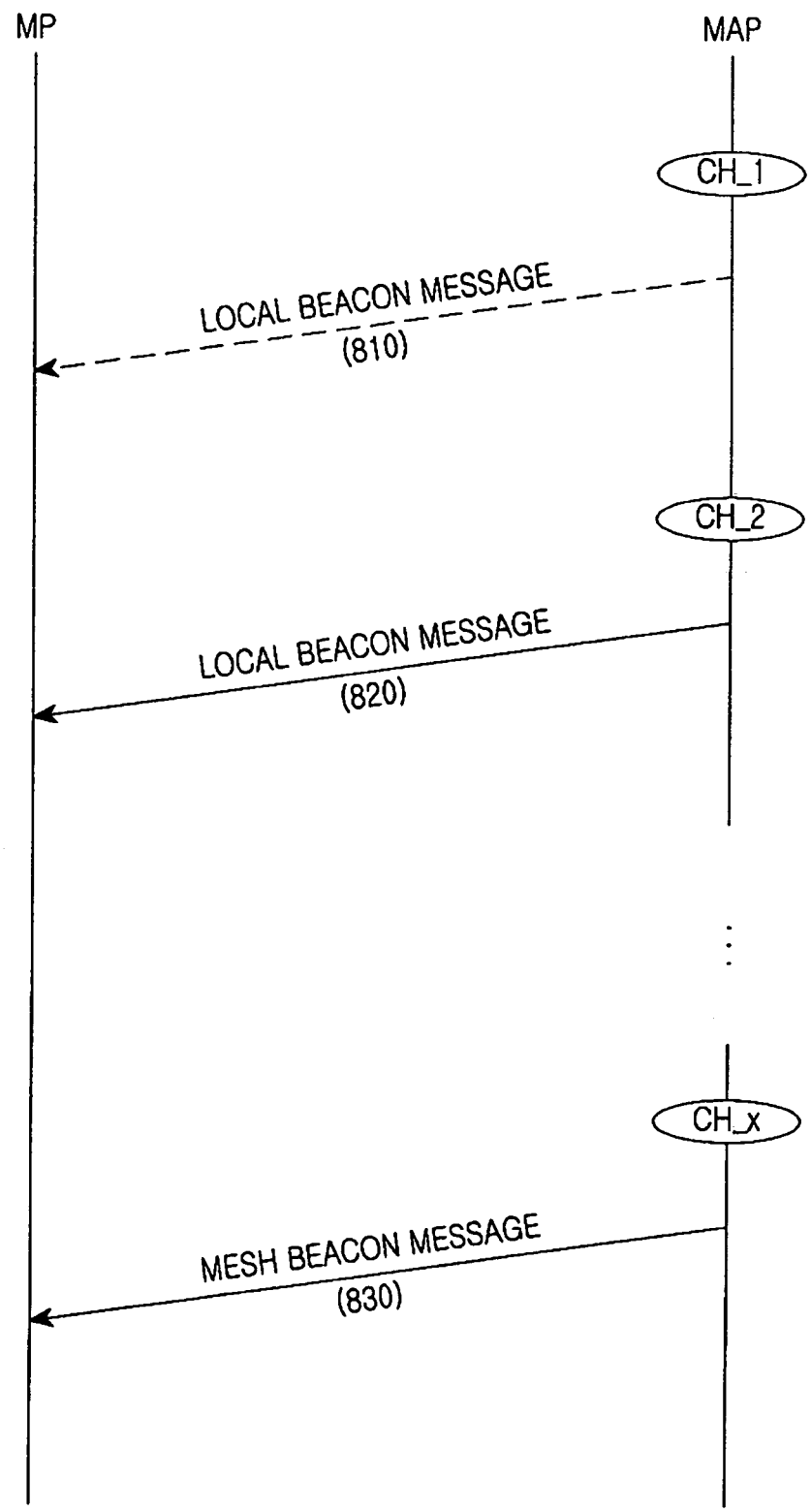
FIG. 8 illustrates a virtual scenario of the passive channel scanning method according to the second exemplary embodiment of the present invention.

FIG. 8 illustrates a virtual scenario of the passive channel scanning method according to the second exemplary embodiment of the present invention. In the virtual scenario, only one MAP is considered.

Referring to FIG. 8, an MP monitors a Beacon message on a first channel CH_1 in step 810. The channel monitoring is done for a preset channel monitoring time. CH_1 is a local channel or a mesh channel.

When the Beacon message is not received, the MP monitors reception of a Beacon message on a second channel CH_2 which is a local channel in step 820.

Upon receipt of a Local Beacon message on CH_2, the MP checks channel switching information in the Local Beacon message and acquires a channel number (CH_x) for association with the mesh network from the channel switching information. The channel number indicates the channel carrying a Mesh Beacon message.

The MP transitions to the acquired channel CH_x without performing the sequential channel scanning according to channel numbers. CH_x is a mesh channel. In step 830, the MP receives a Mesh Beacon message on CH_x. The broadcast time depends on the interface supported by the MP.

If the interface supports a single radio multi-channel, the Mesh Beacon message is broadcast only during a mesh network transmission period. Therefore, the MP can receive the Mesh Beacon message only during the mesh network transmission period. If the interface supports a multi-radio multi-channel, the Mesh Beacon message is broadcast during a preset period. Therefore, the MP can receive the Mesh Beacon message during the preset period.

Upon receipt of the Mesh Beacon message, the MP discontinues the channel scanning for association with the mesh network. That is, even in the presence of channels not yet scanned, the MP no longer performs the channel scanning.

Figure 9:
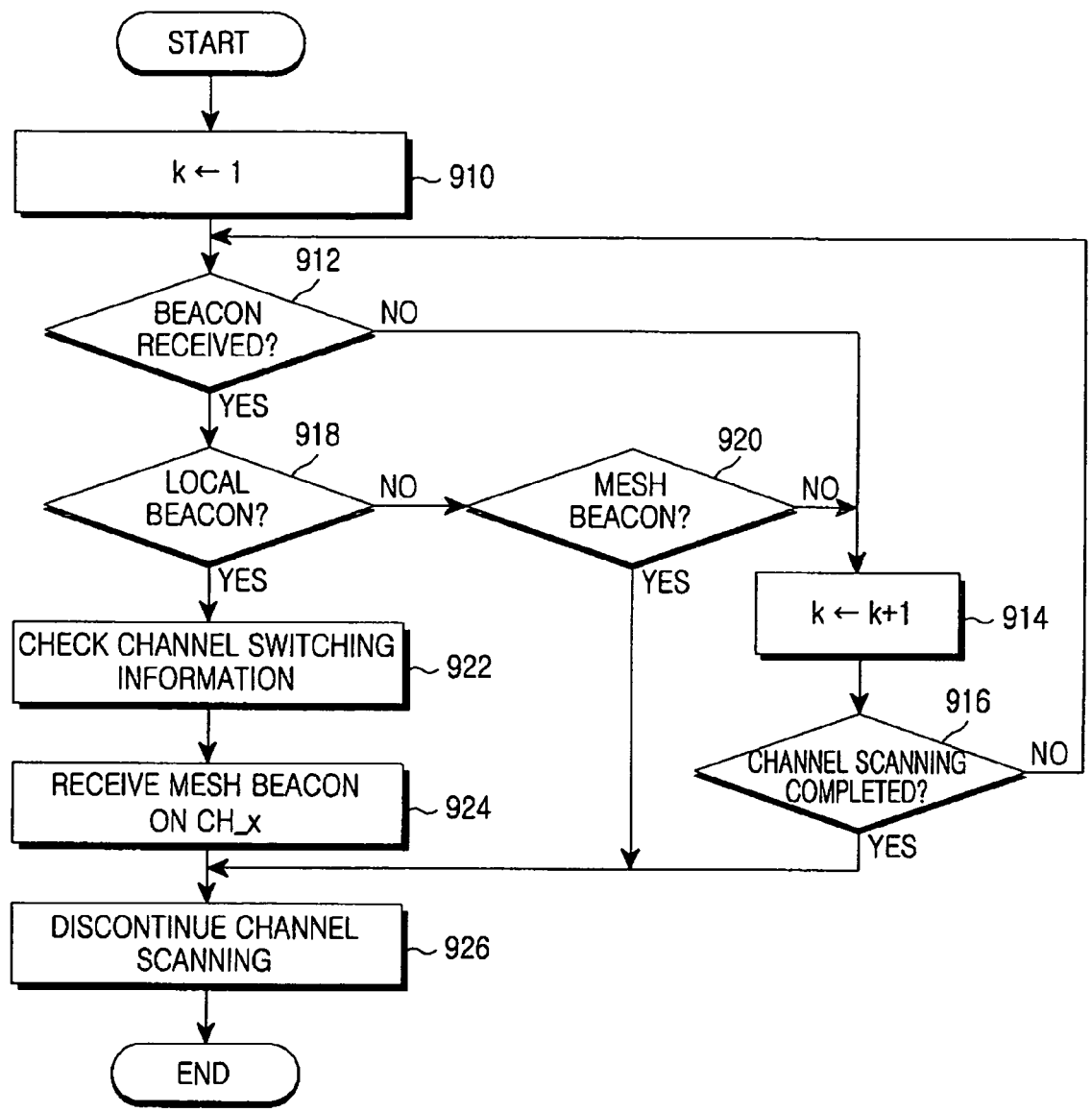
FIG. 9 is a flowchart illustrating a control operation in an MP for performing the passive channel scanning method according to the second exemplary embodiment of the present invention.

FIG. 9 is a flowchart illustrating a control operation in an MP for performing the passive channel scanning method according to the second exemplary embodiment of the present invention.

Referring to FIG. 9, when channel scanning starts, the MP sets a channel number k indicating a channel to be scanned to an initial value 1 in step 910.

In step 912, the MP monitors reception of a Beacon message on a $k^{th}$ channel, CH_k. The monitoring lasts for a preset channel monitoring time.

If the MP fails to receive the Beacon message on CH_k, the MP increases k by 1 to select the next channel to be scanned in step 914. In step 916, the MP determines whether every channel has been scanned. Upon completion of channel scanning for every channel, the MP terminates the channel scanning in step 926. Otherwise, the MP scans the next channel in step 912.

Upon receipt of the Beacon message on CH_k, the MP determines whether the Beacon message is a Local Beacon message in step 918. In cases involving the Local Beacon message, the MP checks channel switching information in the Local Probe Response message and determines that CH_x is a channel to switch to from the channel switching information in step 922.

The MP scans CH_x by receiving a Mesh Beacon message on CH_x in step 924 and discontinues the channel scanning even in the presence of channels to be scanned in step 926.

If the Beacon message is not a Local Beacon message in step 918, the MP determines whether the Beacon message is a Mesh Beacon message in step 920. If so, the MP discontinues the channel scanning in step 926. If the Beacon message is not a Mesh Beacon message, the MP increases k by 1 to select the next channel to be scanned in step 914. In step 916, the MP determines whether every channel has been scanned. Upon completion of channel scanning for every channel, the MP terminates the channel scanning in step 926. Otherwise, the MP scans the next channel in step 912.

In accordance with the second exemplary embodiment of the present invention as described above, a Local Beacon message can be received in a local network. Also, transmission of channel switching information in the Local Beacon message facilitates switching to a channel on which association with the mesh network is possible. When the mesh network is associated, no further channel scanning is performed.

Since information for association with a mesh network is provided in a local management frame in an exemplary embodiment of the present invention, faster channel scanning can be achieved in the mesh network. FIG. 10 illustrates a structure of a newly defined mesh management frame or local management frame according to an exemplary embodiment of the present invention. A management frame (1000) comprises a control field (1010). The control frame is expressed by 2 octets (16 bit). Among the control frame (1010), subtype description is shown in valid type and subtype combination (1020). More particularly, when the type is 00 and subtype is 0110-0111 (1030), mesh beacon message is defined. And when the type is 00 and the subtype is 1101-0111 (1040), mesh probe response is defined. For example, the subtype 0110 corresponds to a backhaul probe response and the subtype 0111 corresponds to a backhaul beacon.

An exemplary embodiment of the present invention also defines a novel Beacon message and a novel Probe Response message, so that an intended mesh network is more accurately detected by channel scanning at a mesh point.

When information about the mesh network is acquired, the mesh point discontinues the channel scanning. The resulting decrease in the time required for the channel scanning may ensure fast association with the mesh network.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A channel scanning method executed at a mesh point (MP) within a mesh network that is associated with a local network, the method comprising:
   receiving a local management frame used in the local network;
   detecting channel switching information from the local management frame;
   switching among a plurality of channels to a mesh channel indicated by the channel switching information; and
   receiving through the mesh channel a mesh management frame used in the mesh network, wherein:
   the local management frame is distinguished from the mesh management frame by identification information contained within each of the local and mesh management frames, and
   the channel switching information indicates a channel number for receiving the mesh management frame.

2. The channel scanning method of claim 1, further comprising discontinuing scanning of channels upon receiving the mesh management frame.

3. The channel scanning method of claim 1, wherein:
   the local management frame comprises a Local Probe Response message communicated in response to a Probe Request message broadcast by the MP, and
   the mesh management frame comprises a Local Probe Response message communicated in response to the Probe Request message.

4. The channel scanning method of claim 1, wherein the local management frame is received through a local channel that differs from the mesh channel, through which the mesh management frame is received.

5. A channel scanning method executed in a mobile access network, the method comprising:
   sending on an allocated local channel, with a mesh access point (MAP), a local management frame comprising channel switching information;
   sending, with the MAP, a mesh management frame on a mesh channel indicated by the channel switching information;
   scanning, with a mesh point (MP), a plurality of channels, comprising at least one of the local channel and the mesh channel, in an order of channel numbers;
   receiving the local management frame, with the MP, by scanning the local channel;
   detecting, with the MP, the channel switching information from the local management frame;
   switching, with the MP, among a plurality of channels to the mesh channel indicated by the channel switching information; and
   receiving the mesh management frame, with the MP, through the mesh channel, wherein:
   the local management frame is distinguished from the mesh management frame by identification information contained within each of the local and mesh management frames, and
   the channel switching information indicates a channel number for receiving the mesh management frame.

6. The channel scanning method of claim 5, further comprising discontinuing scanning the channels, with the MP, upon receiving the mesh management frame.

7. The channel scanning method of claim 5, wherein the local management frame comprises a Local Probe Response message that the MAP sends in response to receiving a Probe Request message broadcast by the MP.

8. The channel scanning method of claim 7, wherein the mesh management frame comprises a Local Probe Response message that the MAP sends in response to receiving the Probe Request message.

9. A channel scanning system in a mobile access network, the system comprising:
- a mesh access point (MAP) configured to send a local management frame, comprising channel switching information, on an allocated local channel and send a mesh management frame on a mesh channel indicated by the channel switching information; and
- a mesh point (MP) configured to:
  - scan a plurality of channels, comprising the local channel and the mesh channel, in an order of channel numbers,
  - receive the local management frame by scanning the local channel,
  - detect the channel switching information from the local management frame,
  - switch among a plurality of channels to the mesh channel indicated by the channel switching information, and
  - receive the mesh management frame through the mesh channel, wherein:
- the local management frame is distinguished from the mesh management frame by identification information contained within each of the local and mesh management frames, and
- the channel switching information indicates a channel number for receiving the mesh management frame.

10. The channel scanning system of claim 9, wherein upon receiving the mesh management frame, the MP discontinues scanning the channels.

11. The channel scanning system of claim 9, wherein the local management frame comprises a Local Probe Response message that the MAP sends in response to receiving a Probe Request message broadcast by the MP.

12. The channel scanning system of claim 11, wherein the mesh management frame comprises a Local Probe Response message sent by the MAP in response to receiving the Probe Request message.

13. A channel scanning apparatus executed at a mesh point (MP) within a mesh network that is associated with a local network, the apparatus comprising:
- a receiver for receiving a local management frame used in the local network; and
- a controller for detecting channel switching information from the local management frame, switching among a plurality of channels to a mesh channel indicated by the channel switching information, and controlling the receiver to receive through the mesh channel a mesh management frame used in the mesh network, wherein:
- the local management frame is distinguished from the mesh management frame by identification information contained within each of the local and mesh management frames, and
- the channel switching information indicates a channel number for receiving the mesh management frame.

14. The channel scanning apparatus of claim 13, wherein the controller discontinues scanning of channels upon receiving the mesh management frame.

15. The channel scanning apparatus of claim 13, wherein:
- the local management frame comprises a Local Probe Response message communicated in response to a Probe Request message broadcast by the MP, and
- the mesh management frame comprises a Local Probe Response message communicated in response to the Probe Request message.

16. The channel scanning apparatus of claim 13, wherein the local management frame is received through a local channel that differs from the mesh channel, through which the mesh management frame is received.

* * * * *